Sept. 11, 1928.
E. C. PETSCH
1,684,197
SYSTEM FOR PREVENTING LIQUIDS FROM FREEZING
Filed May 1, 1923
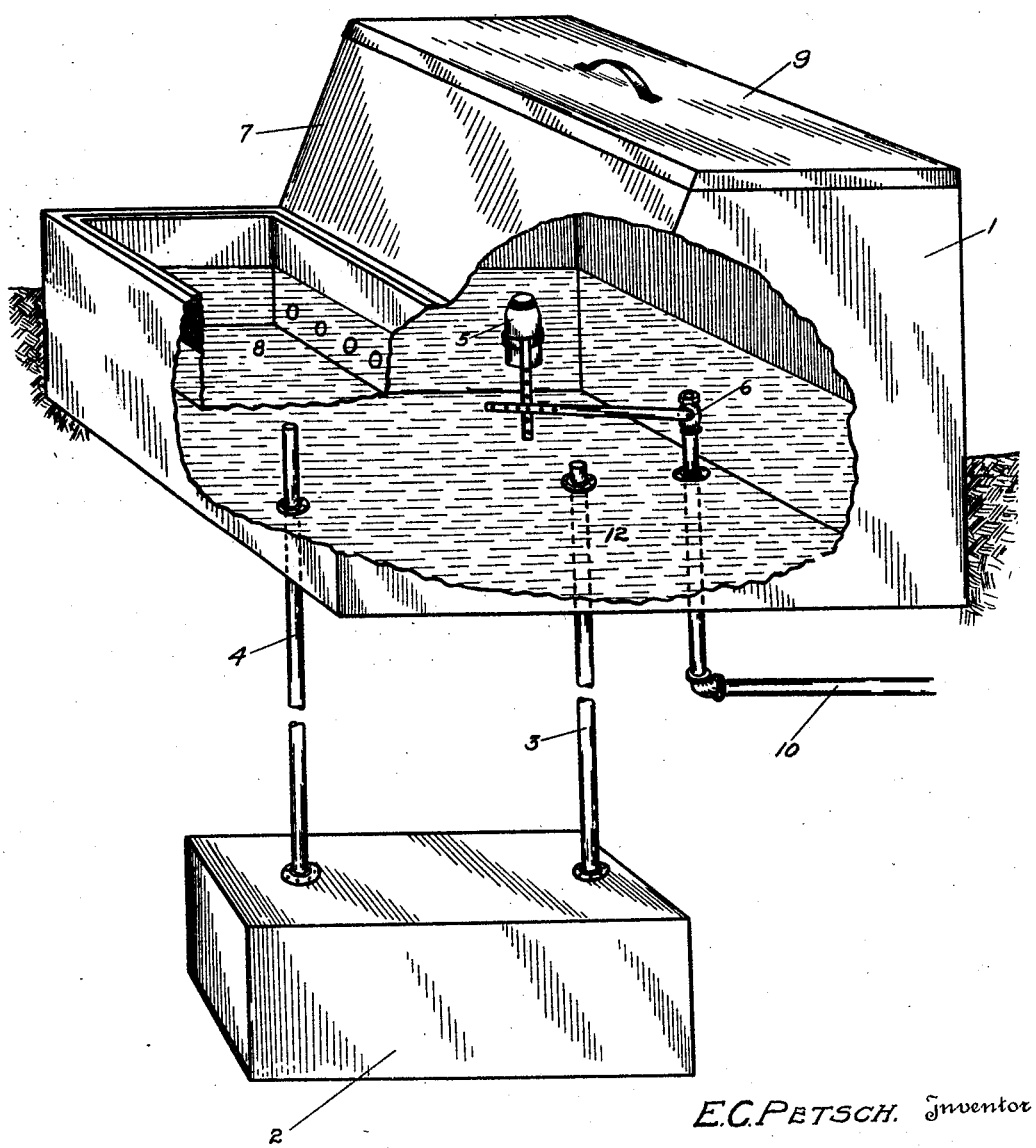
E.C. PETSCH. Inventor
By Emil F. Lange
Attorney Patented Sept. 11, 1928.

1,684,197

UNITED STATES PATENT OFFICE.

EVERETT C. PETSCH, OF PLEASANT DALE, NEBRASKA.

SYSTEM FOR PREVENTING LIQUIDS FROM FREEZING.

Application filed May 1, 1923. Serial No. 635,996.

My invention relates to a system for preventing liquid from freezing and it is particularly applicable to drinking fountains for live stock.

The problem of supplying drinking water to live stock is a difficult one, especially in winter. The water must not only be kept in a reasonably sanitary condition, but it must also be prevented from freezing. The usual method for preventing the freezing of water in stock tanks entails the use of some form of tank heater using fuel for heating purposes. Since tank heaters have been found to be unsatisfactory and unreliable owing to the excessive amount of labor required to keep them in operation and to the cost of fuel and particularly to the fire hazard connected with their operation, relatively few tank heaters are at present in use and the water is doled out to the animals at irregular intervals.

My invention has for its object to provide means for preventing the freezing of water in stock tanks and without the use of artificial heat. Another object is the provision of the tank heater which is automatic in operation and which is so constructed that it may be maintained in a sanitary condition with little or no effort.

Having in view these and other objects I will now refer to the drawing, in which a figure is the medium vertical sectional view of my invention.

The stock tank is shown at 1, 12 being the chamber within the tank. As shown, this tank is set down in the earth and protrudes only slightly above the surface of the earth. It is to be understood, however that the tank may be built with its upper portion at either a higher or lower level, depending on the particular use to which it is to be put. The tank which I have illustrated is designed primarily for supplying water to hogs and it is so positioned as to be most convenient for that purpose. It has a cup 8 which receives water from chamber 12. Any foreign matter introduced by the animals during drinking settles to the bottom of cup 8 and can be easily removed by hand to prevent its fouling the entire body of water in the chamber 12. The tank is provided with a removable cover 9 and a shield 7, which is so positioned relative to the cover 9 and to the cup 8 that the hogs will find it impossible to displace either the shield or the cover. The tank is kept supplied with water from any convenient source of water under pressure by means of the inlet pipe 10 having a float valve 6, which is actuated by float 5 so that the water level is kept constant.

At some distance below the tank 1 is a reservoir 2 which is connected with the tank by means of the pipes 3 and 4. The position of these two pipes is important. The pipe 3 merely enters the bottom of the chamber 12 and the top of chamber 2. The pipe 4 however passes up into the chamber 12 to a point directly under and in close proximity to the bottom of the cup 8.

The tank 1 comprises a surface level tank or a tank which is adapted to be used at or near the surface and to which access of the animals is necessary. The reservoir 2 comprises a sub-surface tank which is adapted to be embedded in the ground below the frost line, or to the desired depth. The two tanks, while independent one of the other, are connected by two pipes 3 and 4 which are of relatively small diameter and are spaced apart sufficiently to set up convection currents incident to the differences in temperature of the water at different levels. Each tank contains a body of water which in itself is in circulation by convection currents and these independent currents in the separate tanks or containers are augmented by the provision of the pipes, particularly since one pipe opens into and near the bottom of the upper or surface tank, while the other pipe opens near the top of the surface tank.

In the use of the tank the cold water in the chamber 12 tends to settle down to the bottom of the chamber and to flow into the chamber 2 through the pipe 3. The sinking of the colder water displaces an equal quantity of water in the chamber 2 forcing it upwardly through the pipe 4 so that a constant flow is established by the two chambers whenever there is sufficient variation in the temperatures of the two chambers. Since the chamber 2 is below the freezing level the water in that chamber cannot freeze and since it mingles with the water of chamber 12 it will keep that water also from freezing. Heat is absorbed by the flowing water both from the sub-soil and also from the friction of the moving water. The device depends on the familiar thermo-siphon principle, but it utilizes the heat of the sub-soil and applies the heat of the upward current of water at a point where it will effectively warm the most quiescent portion of the water in the stock tank.

The depth of the tank 2 depends very largely on the locality. In order to function at all times it must be located below the freezing depth. The temperature of the sub-soil increases steadily with the increase in depth so that any desired temperature may be obtained by selecting the proper depth. The walls of the tank 2 should be water tight to prevent the loss of water. The size of the tank 2 relative to that of the tank 1 depends to a large extent on the amount of current sent up through the pipes 3 and 4, and this amount of current varies with the differences in temperature of the water in the tanks 1 and 2. Since the tank 2 is positioned where the temperature is fairly constant the only variation in temperature is found in the tank 1, the result being that a fall in temperature of the outside air will set up a more active flow of water through the pipes 3 and 4.

Having thus described my invention in terms which will be readily understood by others skilled in the art to which it pertains, what I claim as new and desire to secure by Letters Patent of the United States is:

1. A stock tank which is partially submerged beneath the surface of the earth, means for supplying said tank with water and for maintaining the water within the tank at a constant level, a water reservoir positioned in the subsoil beneath the frost line, and a thermo-siphon connection between said reservoir and said tank.

2. A stock tank which is partially submerged beneath the surface of the earth, means for supplying said tank with water and for maintaining the water within the tank at a constant level, a drinking cup fixed in position within said tank, a removable cover for a portion of said tank, a guard between said cover and said drinking cup, a water reservoir positioned in the subsoil beneath the frost line and a thermo-siphon connection between said reservoir and said tank.

3. A stock tank which is partially submerged beneath the surface of the earth, a drinking cup fixed in position within said tank, a removable cover for a portion of said tank, a guard between said cover and said drinking cup, a water reservoir positioned in the subsoil beneath the frost line, and a thermo-siphon connection between said reservoir and said tank, the upward current of water from said reservoir passing through a pipe which discharges immediately underneath said drinking cup to thereby prevent the freezing of the contents of the drinking cup.

4. A stock watering tank, a source of water under pressure, means for conducting the water from said source into said tank, means for preventing the overflow of water in said stock tank, a second tank positioned in the subsoil underneath said stock watering tank and entirely beneath the frost line, a pipe communicating with the interior of said second tank and the upper portion of said stock watering tank, and a second pipe communicating with said second tank and with the bottom portion of said stock watering tank.

5. A stock fountain comprising a surface tank having a cover and an opening near its top for access to animals to the interior of the tank, means for maintaining a predetermined surface level of water in the surface tank, a sub-surface tank adapted to be embedded in the ground and spaced below said surface tank, and a pair of spaced pipes of relatively small diameter connecting said surface and sub-surface tanks, one of said pipes opening upwardly into the surface tank near the bottom thereof and the other pipe opening into the surface tank near the top thereof, said surface level of water in the surface tank adapted to be above the upper ends of said pipes.

EVERETT C. PETSCH.